United States Patent [19]
Thompson et al.

[11] Patent Number: 5,791,704
[45] Date of Patent: Aug. 11, 1998

[54] IRRIGATION PIPE TOOLS

[76] Inventors: Andy L. Thompson, R.R. 1, Courtland, Kans. 66939; Jeffrey L. Thompson, 815 S. 18th St., #610, Arlington, Va. 22202

[21] Appl. No.: 661,026

[22] Filed: Jun. 10, 1996

Related U.S. Application Data

[63] Continuation-in-part of Ser. No. 274,733, Jul. 18, 1994, Pat. No. 5,524,946.

[51] Int. Cl.⁶ ............... B25B 13/50; B65G 7/12
[52] U.S. Cl. ............................. 294/17; 81/176.1
[58] Field of Search .................. 294/11, 14–17, 294/19.1, 26, 90, 92; 81/119, 120, 176.1; 254/44, 120, 121, 131

[56] References Cited

U.S. PATENT DOCUMENTS

| | | | |
|---|---|---|---|
| 181,693 | 8/1876 | Lloyd | 294/17 |
| 464,084 | 12/1891 | Robinson | 81/176.1 |
| 870,449 | 11/1907 | May | 81/98 |
| 1,006,348 | 10/1911 | Beran | 294/17 X |
| 1,205,852 | 11/1916 | Buehler | 294/15 |
| 1,303,157 | 5/1919 | Brockway | 81/176.1 |
| 1,401,046 | 12/1921 | Clymer | 294/15 |
| 1,945,406 | 1/1934 | Adams | 81/119 |
| 2,026,516 | 1/1936 | Chestnut et al. | 81/99 |
| 2,378,454 | 6/1945 | Werling | 294/15 |
| 2,420,458 | 5/1947 | Barker | 81/176.1 |
| 2,517,041 | 8/1950 | Sisley | 81/99 X |
| 2,559,973 | 7/1951 | Kunz | 81/99 |
| 2,697,000 | 12/1954 | Giffin | 294/15 |
| 2,788,237 | 4/1957 | Misiura | 294/17 |
| 2,819,111 | 1/1958 | Cozzens | 294/16 X |
| 2,873,995 | 2/1959 | Turner | 294/15 |
| 2,915,333 | 12/1959 | Koenig et al. | 294/16 X |
| 3,003,379 | 10/1961 | Pribitzer | 81/119 |
| 3,230,783 | 1/1966 | Anderson | 81/176.1 X |
| 3,347,586 | 10/1967 | Sharp | 294/104 X |
| 4,013,313 | 3/1977 | Gardels | 294/17 |
| 5,024,476 | 6/1991 | Massey | 294/16 |

FOREIGN PATENT DOCUMENTS

| | | | |
|---|---|---|---|
| 44356 | 7/1918 | Sweden | 294/17 |
| 2207384 | 2/1989 | United Kingdom | 294/16 |

*Primary Examiner*—Johnny D. Cherry
*Attorney, Agent, or Firm*—Jeffrey L. Thompson

[57] ABSTRACT

A series of pipe manipulating tools having an elongated handle and a pipe engaging portion that grips a pipe when a force in a single direction is applied to the handle. A pipe engaging portion of a first pipe rotating tool has a first pivotally mounted arcuate jaw with a hand grip secured thereto, and a second arcuate jaw fixedly mounted to the handle. A spring biases the jaw members into clamping engagement with a pipe during use. Pipe engaging portions of second, third, fourth, and fifth pipe turning tools each have an arcuate member fixed to a handle, and at least one engagement tooth fixed at an end of the arcuate member for engaging a hook-receiving recess or protrusion on a bell end of an irrigation pipe. A pipe engaging portion of a sixth pipe tool includes an engagement tooth extending axially from a handle to engage a groove recess on a bell end of an irrigation pipe. The sixth pipe tool can be used to pull apart irrigation pipelines without gripping the bell end of the pipe by hand. A pipe engaging portion of a seventh pipe tool includes a U-shaped engagement member for pulling and lifting pipe that does not have a groove recess on the bell end. An eighth pipe tool is provided for lifting a male end of a pipe to facilitate alignment of the pipe ends during a connecting procedure.

7 Claims, 5 Drawing Sheets

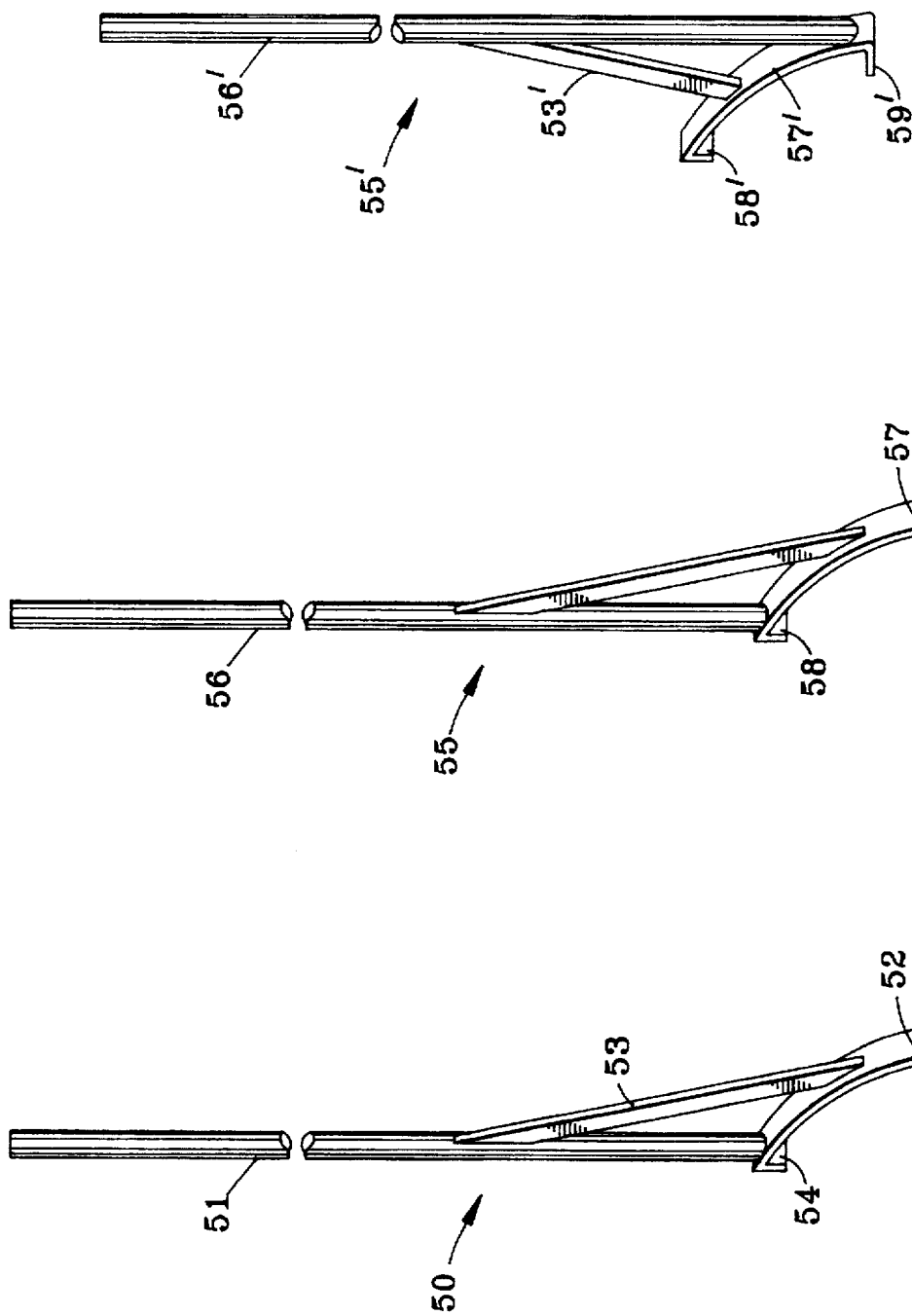

IRRIGATION PIPE TOOLS

STATEMENT OF RELATED CASES

This application is a continuation-in-part of U.S. patent application Ser. No. 08/274,733, which was filed on Jul. 18, 1994, now U.S. Pat. No. 5,524,946.

BACKGROUND OF THE INVENTION

1. Field of the Invention

The present invention relates generally to tools for manipulating pipe and, in particular, to hand-held tools for engaging various portions of irrigation pipe to manipulate the pipe without undue physical strain on the operator.

2. Description of the Prior Art

There are many types of irrigation systems known in the prior art. One common system with which the present invention is particularly well suited for use includes a series of lengths of pipe connected together across an end of a field. The lengths of pipe each typically have a female bell connector at one end and a male connector at the other end. Several (e.g., 6 to 18) adjustable gate valves are typically spaced along the length of each pipe joint. The lengths of pipe are typically made of aluminum or plastic and range in size from 20 to 36 feet in length and from 6 to 12 inches in diameter, with a 30 foot length and 8 to 10 inch diameter being the most common. The lengths of pipe typically weigh approximately 50 to 150 pounds, depending on the size and material of the pipe and the amount of sediment accumulated within the pipe.

Irrigating is often the most labor intensive task on an agricultural farm in areas having limited rainfall. The irrigation system described above using lengths of pipe requires carrying the lengths of pipe to the field to be irrigated at the beginning of each irrigating season, distributing the lengths of pipe across the end of the field, connecting the lengths of pipe together by inserting the male ends into the female ends of adjacent lengths of pipe, and adjusting the flow of water through the adjustable gate valves each time water is applied to the crop. It is often necessary to rotate the individual lengths of pipe after they have been connected together across the end of the field in order to direct the flow of water out of the gate valves to an appropriate angle away from the pipe.

Another common practice, particularly in areas where a large amount of sediment accumulates in the lengths of pipe during the irrigation season, involves flushing the lengths of pipe by opening the gate valves, turning the lengths of pipe so that the open gate valves are directed downward, and pumping water, along with the accumulated sediment, through the open gate valves. In addition, at the end of the season, the pipe usually must be disconnected, picked up, and carried out of the field.

Two of the most physically demanding tasks with the irrigation pipe system described above are turning the pipe to flush out the accumulated sediment or to adjust the angle of the water flow after the lengths of pipe are connected together (especially if the pipe is filled with water), and disconnecting the lengths of pipe at the end of the irrigating season. These tasks are even more difficult after the pipe settles during the irrigation season (typically one to three months), after sediment accumulates within the pipe, or as vegetative growth is allowed to grow under and around the pipe. A rubber gasket is typically used to seal the connection joints against leakage, thus increasing the force required to rotate and disconnect the lengths of pipe.

One known prior art system for rotating irrigation pipe has a pair of clamping jaws and a scissor-type handle for engaging the pipe. This system requires the use of two hands to operate the handle to apply a clamping force to the pipe. Thus, in situations where the operator's hands are full of other tools, such as shovels and gate valve adjusting tools, the known turning tool is unwieldy and not very useful. This known tool is also relatively complex, making it more difficult and expensive to manufacture.

The most common method of disconnecting the lengths of pipe at the end of the irrigation season is to grip the bell end of the pipe with the operator's hands (preferably wearing gloves to avoid cuts and abrasions) and twisting and pulling until the adjacent pipe connection comes apart. This method is, of course, very strenuous on the irrigator, often resulting in lower back pain, sore hands, and physical exhaustion. In addition, the irrigator is limited as to the amount of force he can apply without his hands slipping from the end of the pipe.

Another task that is difficult for some irrigators is aligning the pipe ends during the initial set-up of the irrigation system. This task traditionally required frequent bending over to grip and raise the ends of the lengths of pipe for alignment and connection with ends of the adjacent lengths of pipe (e.g., raising the male ends of the pipe to align with the female bell ends of the pipe). Such frequent bending is particularly difficult and painful for irrigators that suffer from lower back pain or other physical problems.

Thus, there is a need for devices to reduce the physical exertion required for these tasks without the disadvantages of the prior art described above.

SUMMARY OF THE INVENTION

It is an object of the present invention to provide tools for manipulating pipe without undue physical strain on the operator while enhancing the operator's ability to rotate, lift, and/or disconnect lengths of pipe.

It is a further object of the present invention to provide irrigation pipe tools that are lightweight, and are relatively simple and inexpensive to manufacture.

It is yet a further object of the present invention to provide irrigation pipe tools for rotating individual lengths of pipe using a force applied in a single direction to the handle of the tool.

It is yet another object of the present invention to provide an irrigation pipe tool for gripping an open bell end of a pipe for pulling adjacent pipes apart.

It is yet a further object of the present invention to provide an irrigation pipe tool for engaging and lifting an end of an irrigation pipe without requiring the operator to bend over.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, the present invention provides a pipe turning tool comprising an elongated handle, an engaging member fixed to the handle, and at least one engagement tooth fixed to and extending from the pipe engaging member for engaging a recess or protrusion on a pipe to be turned, the engagement tooth extending in a direction generally radially inward toward a pipe to be turned, the engagement tooth and the pipe engaging member providing a pipe engaging arrangement that permits a pipe to be turned upon applying a single force to the handle in a direction of turning.

The pipe turning tool preferably comprises an arcuate member having a concave surface for receiving a pipe to be turned. The arcuate member has a first end adjacent to the handle and a second end circumferentially spaced from the handle. The arcuate member extends circumferentially approximately 60 to 100 degrees about a center axis of a pipe to be turned.

The engagement tooth can be fixed to and extend from the first end of the arcuate member adjacent the handle, or the second end of the arcuate member circumferentially spaced from the handle. Alternatively, an engagement tooth can be fixed to and extend from both ends of the arcuate member. The latter embodiment is preferred because it makes the tool more versatile by increasing the circumferential positions that the tool can conveniently engage a hook-receiving recess or protrusion on the pipe to be turned.

The first and second engagement teeth preferably extend from the arcuate member at an angle less than 90 degrees relative to a tangential line through an adjacent portion of the arcuate member. The engagement teeth extend in directions that are angled slightly toward each other to reduce the tendency of the engagement teeth to slip out of engagement with the pipe as the pipe is turned. An angle brace extends between the handle and a portion of the pipe engaging member spaced from the handle. The pipe engaging member may be formed, for example, of a portion of a spring steel shank of a farm implement.

In accordance with another aspect of the present invention, a pipe lifting and pulling tool is provided that comprises an elongated handle having a hand grip secured to a first end thereof, and a pipe engaging portion secured to a second end of the handle, the pipe engaging portion comprising an engagement jaw that opens in a direction perpendicular to a longitudinal axis of the handle for receiving and gripping an edge of a pipe end.

The pipe engaging portion of the pipe lifting and pulling tool according to one embodiment comprises an engagement tooth extending from an upper side of the jaw in a longitudinal direction of the handle for engaging a groove in a bell end-of a pipe, a stabilizing portion extending generally perpendicularly to the engagement tooth and defining a lower side of the jaw, and a space between the engagement tooth and the stabilizing portion for receiving an edge of a bell end of a pipe.

In another embodiment, the pipe engaging portion of the pipe lifting and pulling tool comprises a U-shaped engagement member having a lower face, a rear face, and an upper face, the upper face and the lower face extending generally perpendicular to the handle and defining a space therebetween for receiving an edge of a bell end of a pipe.

In accordance with another aspect of the present invention, a pipe turning tool is provided that comprises an elongated handle, and a pipe engaging portion connected at one end of the handle, the pipe engaging portion having means for securely gripping a portion of a pipe for turning the pipe when a force is applied to the handle in a direction of turning. The means for gripping comprises a first jaw pivotally mounted to the handle about a pivot connection point, a second jaw fixedly connected to the handle, and a spring means for biasing the first and second jaws into engagement with opposite sides of a pipe during use. The first jaw comprises an arcuate band portion for engaging a pipe to be turned, and a mounting portion for pivotally mounting the first jaw to the handle, the mounting portion having the pivot connection point extending therethrough. A hand grip is secured to a backside of the first jaw to facilitate positioning of the first jaw about a pipe to be turned and to facilitate removal of the pipe engaging portion from a pipe after turning.

The arcuate band portion of this pipe turning tool preferably extends circumferentially from the pivot connection point approximately 160 to 200 degrees in a first direction about a center axis of a pipe to be turned, and the second jaw includes a second arcuate pipe engaging portion extending circumferentially from the handle approximately 10 to 50 degrees in a second direction about the center axis opposite from the first direction.

BRIEF DESCRIPTION OF THE DRAWINGS

The present invention will become more clearly appreciated as the disclosure of the present invention is made with reference to the accompanying drawings. In the drawings:

FIG. 5 is a perspective view of a pipe turning tool according to a third embodiment of the present invention;

FIG. 6 is a perspective view of a pipe turning tool according to a fourth embodiment of the present invention;

FIG. 7 is a perspective view of a pipe turning tool according to a fifth embodiment of the present invention;

DETAILED DESCRIPTION OF THE
PREFERRED EMBODIMENTS

Reference will now be made in detail to the preferred embodiments of the invention, examples of which are illustrated in the accompanying drawings. The present invention is directed to hand-held tools for manipulating irrigation pipe or other objects of a similar structure. The structure and functions of the preferred embodiments of these tools are described below.

Figure 2:
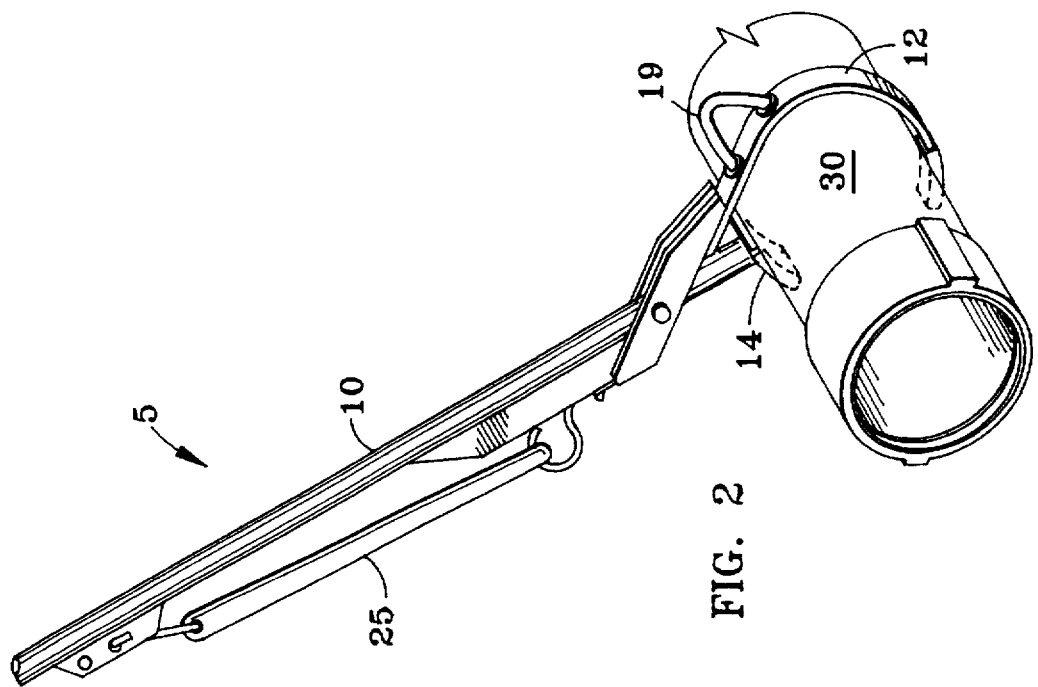
FIG. 2 is a perspective view showing the pipe turning tool of FIG. 1 in engagement with a pipe to be turned.
Figure 1A:
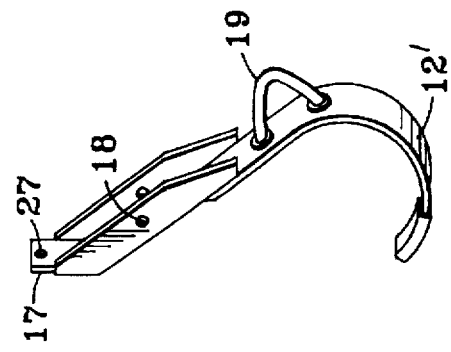
FIG. 1A is a perspective view of a replaceable jaw assembly for the pipe turning tool shown in FIG. 1.
Figure 1:
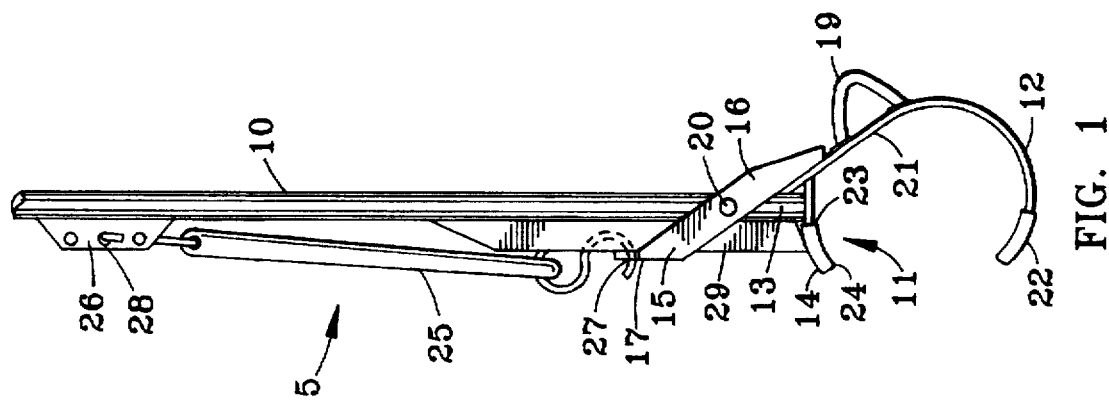
FIG. 1 is a side view of a pipe turning tool according to a first embodiment of the present invention.

Referring to FIGS. 1, 1A and 2, a tool 5 for engaging a smooth outside surface of a pipe for turning the pipe according to a first embodiment will be described. The pipe turning tool 5 includes an elongated handle 10 and a pipe engaging portion 11. The pipe engaging portion 11 has a pivoting jaw 12 pivotally mounted to the handle 10 near a first end 13 of the handle, and a fixed jaw 14 fixedly mounted to the first end 13 of the handle. As shown in FIG. 2, the pivoting jaw 12 and the fixed jaw 14 engage diametrically opposite sides of a pipe during use.

The pivoting jaw 12 includes a fork portion 15 which straddles the handle 10. The fork portion 15 includes two flat side plates 16 and an abutment portion 17 bridging the side plates 16 at a first end thereof. The side plates 16 each have an aperture 18 extending therethrough at a location intermediate the ends of the side plates 16. An aperture (not shown) corresponding to the apertures 18 is formed in the handle 10. A bolt 20 extends through the apertures 18 and the aperture in the handle for pivotally mounting the jaw 12 to the handle 10. The pivoting jaw 12 also includes a pipe engaging portion in the form of an arcuate band 21 fixed to the end of the side plates 16 opposite the abutment portion 17.

The arcuate band 21 extends circumferentially from the first end 13 of the handle 10 approximately 160 to 200 degrees in a first direction about a center axis of a pipe to be turned. A rubber or plastic sleeve 22 preferably covers the free end of the arcuate band 21 to enhance friction between the tool and the surface of the pipe to be turned and to prevent scoring of the pipe. The sleeve 22 can also be formed of other suitable and equivalent materials, such as natural and synthetic fabrics.

The fixed jaw 14 is also in the form of an arcuate band 23, which preferably has a rubber or plastic sleeve 24 covering a free end thereof. The arcuate band 23 extends circumferentially from the first end 13 of the handle 10 approximately 10 to 50 degrees in a second direction, opposite from the first direction of the arcuate band 21, about the center axis of a pipe to be turned. As can be seen in FIG. 1, the fixed arcuate band 23 is substantially shorter than the pivoting arcuate band 21. The pivoting jaw 12 can be easily changed by removing the bolt 20 and sliding the jaw 12 over the handle 10. A second pivoting jaw 12' (FIG. 1A) with an arcuate band having a different radius than the arcuate band 21 of the original pivoting jaw 12 can then be connected to the handle 10 for engaging and turning pipe of a different size.

A spring biasing arrangement is provided for biasing the pivoting jaw 12 into clamping engagement with the pipe during use. The spring biasing arrangement preferably includes a tension spring in the form of a rubber strap 25 connected between a flange 26 extending from an intermediate portion of the handle 10 and an aperture 27 formed in the abutment portion 17 of the pivoting jaw 12. The rubber strap 25 biases the pivoting member in a clockwise direction with respect to the handle 10, as viewed in FIG. 1. The flange 26 includes a plurality of apertures 28 spaced therealong to enable adjustment of the length and tension of the rubber strap 25 during use. The higher the tension in the rubber strap 25, the higher the gripping force of the tool on the pipe. A metal coil spring or other equivalent spring arrangement can be used in place of the rubber strap 25.

An additional flange 29 extends along the handle 10 to reinforce the handle and the fixed jaw 14 and to provide an abutment surface for the abutment portion 17 of the pivoting jaw 12. Alternatively, the end of the arcuate member 23 opposite the sleeve 24 can act as an abutment for engaging the arcuate member 21 and limiting the movement of the pivoting jaw 12.

A hand grip 19 is preferably fixed to the back side of the arcuate band 21 to facilitate positioning the pipe engaging portion 11, and particularly the pivoting jaw 12, over a pipe to be turned. With the hand grip 19, an operator can easily pull the pivoting jaw open against the biasing force of the spring 25 prior to placing the tool about a pipe to be turned. The hand grip 19 also provides a convenient handle for removing the tool 5 from a pipe after the pipe is turned with the tool.

The operation of the pipe turning tool 5 of the first embodiment is shown in FIG. 2. Using the hand grip 19, the tool is positioned about the outer surface of the pipe 30 at any position along the length of the pipe. The pivoting jaw 12 is positioned on a diametrically opposite side of the pipe 30 from the fixed jaw 14 so that the clamping action of the jaws acts to securely grip the pipe. The lever action of the elongated handle 10, in combination with the geometry of the pivoting and spring biasing arrangement of the pipe engaging portion 11, enable the tool 5 to easily grip and turn a pipe when an operator applies force on the handle 10 in a desired direction of turning (e.g., counter-clockwise as shown in FIG. 2). The tool can also be ratcheted (moved in a clockwise direction as shown in FIG. 2) to grip the pipe at a new circumferential position to obtain an additional grip on the pipe 30 without removing the tool from the pipe 30. After the pipe is turned to the desired angular position, the hand grip 19 can be lifted to easily remove the tool 5 from the pipe 30.

The tool 5 can be quickly adapted for use with different size pipe by replacing the pivoting jaw 12 with the different size jaw 12'. For example, the first jaw 12 may be sized for ten-inch irrigation pipe, and the second jaw 12' may be sized for eight-inch irrigation pipe. The arcuate bands 21 and 23 of the tool 5 are preferably made from spring steel segments, which can be obtained, for example, from new or used springtooth and field cultivator farming implements and the like.

Figure 4:
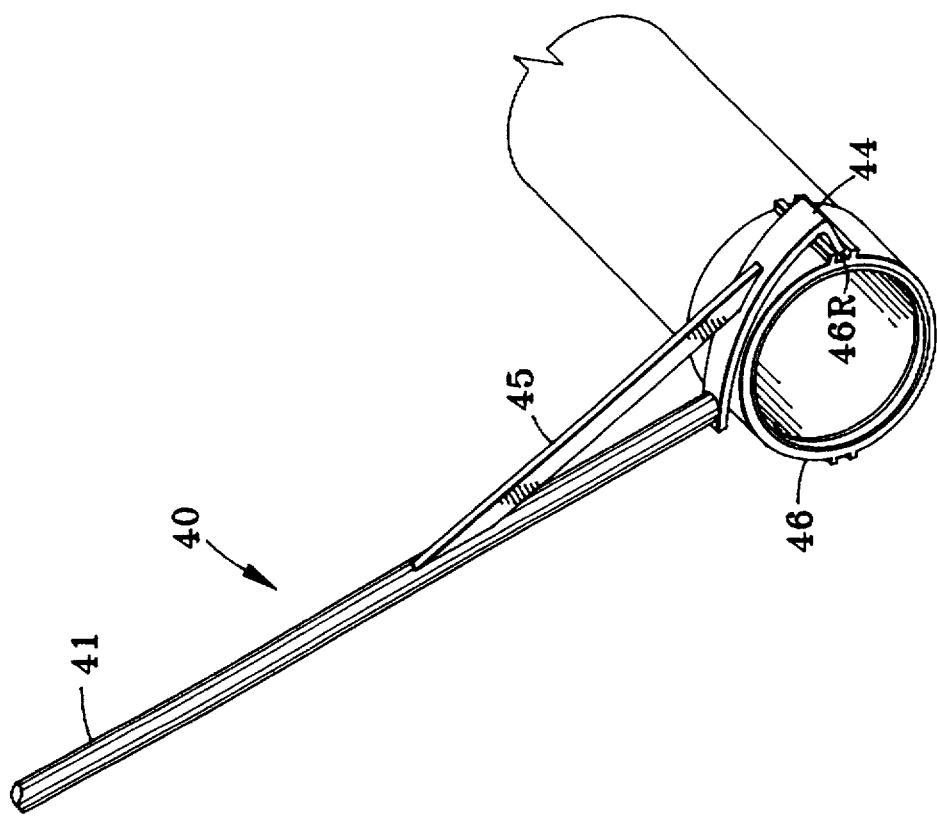
FIG. 4 is a perspective view showing the pipe turning tool of FIG. 3 in engagement with a pipe to be turned.
Figure 3:
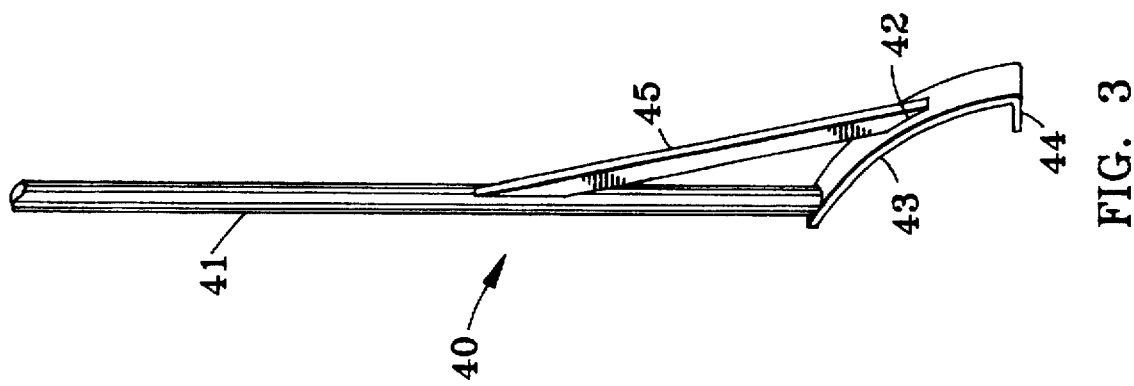
FIG. 3 is a perspective view of a pipe turning tool according to a second embodiment of the present invention.

Referring to FIGS. 3 and 4, a pipe turning tool 40 according to a second embodiment of the present invention is shown. The pipe turning tool 40 includes an elongated handle 41 and a pipe engaging portion 42. The pipe engaging portion 42 has an arcuate-shaped band member 43 with a radius of curvature, which is slightly greater than the radius of a bell end of a pipe to be turned. The end of the band member 43 is connected to the handle 41 by welding or the like. A line passing through the ends of the band member 43 preferably forms an obtuse angle with the handle 41 of approximately 120 to 140 degrees.

An engagement tooth 44 extends from a free end of the arcuate member 43 at an angle of slightly less than 90 degrees with respect to a tangential line through the free end of the arcuate member 43. A distance between the end of the band member 43 connected to the handle 41 and the engagement tooth 44 is preferably 6 to 10 inches for a typical bell end of a 6 to 10 inch diameter irrigation pipe. An angle brace 45 extends between the handle 41 and the arcuate member 43 to reinforce the engaging portion 42 during heavy use.

In operation, as shown in FIG. 4, the tool 40 is placed over a bell end 46 of a conventional irrigation pipe so that the engagement tooth 44 extends into engagement with a hook-receiving recess or protrusion 46R on either side of the pipe. The pipe is then rotated to a desired position by applying a force to the handle 41 in the desired direction of rotation. As shown in FIG. 4, the tool 40 is positioned for rotating the pipe in a counter-clockwise direction. Since the tool 40 has no moving parts, it is very simple to operate, making it especially convenient for use in conditions where the operator is carrying other tools (e.g., shovels, gate changers, etc.) or has only one usable hand.

Referring to FIG. 5, a pipe turning tool 50 according to a third embodiment of the present invention will be described. The pipe turning tool 50 has a handle 51, an arcuate-shaped band member 52, and an angle brace 53 that are generally similar to those corresponding elements of the tool 40 shown in FIG. 3. However, rather than an engagement tooth extending from the distal free end of the arcuate member, as in the tool 40, an engagement tooth 54 extends from an end of the arcuate member 52 adjacent the handle 51.

The arcuate member 52 preferably has a radius of curvature, which is slightly greater than the radius of a bell end of a pipe to be turned. A line passing through the ends of the arcuate member 52 preferably forms an obtuse angle with the handle 51 of approximately 120 to 140 degrees. The engagement tooth 54 preferably extends from the arcuate member 52 at an angle of slightly less than 90 degrees with respect to a tangential line through the adjacent portion of the arcuate member 52, in a direction that is angled slightly toward the distal end of the arcuate member 52.

In operation, the tool 50 is placed over a bell end of a conventional irrigation pipe so that the engagement tooth 54 extends into engagement with a hook-receiving recess or protrusion on either side of the pipe. The pipe is then rotated to a desired position by applying a force to the handle 51 in the desired direction of rotation. As shown in FIG. 5, the tool 50 is positioned for rotating a pipe in a clockwise direction. The tool 50 is useful in conjunction with the tool 40 because it engages the pipe at a different circumferential position than the tool 40. Thus, in situations where the hook-receiving recess or protrusion on the pipe is in an awkward circumferential position for engagement by the tool 40, the tool 50 can be used to engage and turn the pipe, and vice versa.

Referring to FIG. 6, a pipe turning tool 55 according to a fourth embodiment of the present invention will be described. The pipe turning tool 55 has a handle 56, an arcuate-shaped band member 57, and an angle brace that are generally similar to those corresponding elements of the tools 40 and 50, as shown in FIGS. 3 and 5, respectively. However, rather than an engagement tooth extending from just one end of the arcuate member, as in the tools 40 and 50, engagement teeth 58 and 59 extend from both ends of the arcuate member 57.

The arcuate member 57 preferably has a radius of curvature, which is slightly greater than the radius of a bell end of a pipe to be turned. A line passing through the opposite ends of the arcuate member 57 preferably forms an obtuse angle with the handle 56 of approximately 110 to 150 degrees. The arcuate member 57 extends circumferentially about the bell end of the pipe to be turned approximately 60 to 100 degrees about the center axis of the pipe. A distance between the opposite ends of the arcuate member 57 of about 6 to 10 inches is preferable for a typical bell end of a 6 to 10 inch diameter irrigation pipe.

The first engagement tooth 58 preferably extends from the arcuate member 57 at an angle of slightly less than 90 degrees with respect to the adjacent portion of the arcuate member 57, and in a direction that is angled slightly toward the second engagement tooth 59. The second engagement tooth 59 preferably extends from the free end of the arcuate member 57 at an angle of slightly less than 90 degrees with respect to the adjacent portion of the arcuate member 57, and in a direction that is angled slightly toward the first engagement tooth 58. With the engagement teeth 58 and 59 oriented in this fashion, the teeth 58 and 59 resist the tendency to slip out of engagement with the recess or protrusion on a pipe to be turned.

In operation, the tool 55 is placed over a bell end of a conventional irrigation pipe so that one of the engagement teeth 58 and 59 engage a hook-receiving recess or protrusion on the pipe. The pipe is then rotated to a desired position by applying a force to the handle 56 in the desired direction of rotation. As shown in FIG. 6, the engagement tooth 58 can be used for rotating a pipe in a clockwise direction, and the engagement tooth 59 can be used for rotating a pipe in a counter-clockwise direction.

The tool 55 combines the features of both tool 40 (FIG. 3) and tool 50 (FIG. 5) and, thus, can be used to conveniently engage the pipe at any circumferential position. In situations where the hook-receiving recess or protrusion on the pipe is in an awkward circumferential position for engagement by one or the other of the tools 40 and 50, the tool 55 will always be convenient to use. This is particularly advantageous where different types of pipe having a variety of hook-receiving recesses or protrusions are used along the same pipeline. As with the tools 40 and 50, the tool 55 has no moving parts and is simple to operate, making it convenient for use in conditions where the operator is carrying other tools or has only one usable hand.

Referring to FIG. 7, a pipe turning tool 55' according to a fifth embodiment will be described. The pipe turning tool 55' is similar to the pipe turning tool 55 (FIG. 6), except that the handle 56' is connected to an opposite end of the arcuate member 57'. Thus, a line passing through the ends of the arcuate member 57' forms an angle of approximately 30 to 70 degrees relative to the longitudinal axis of the handle 56'. The tool 55' includes an angular brace 53' and engagement teeth 58' and 59' similar to those corresponding elements of the tool 55. The operation of the tool 55' is generally the same as the operation of the tool 55.

Figure 9:
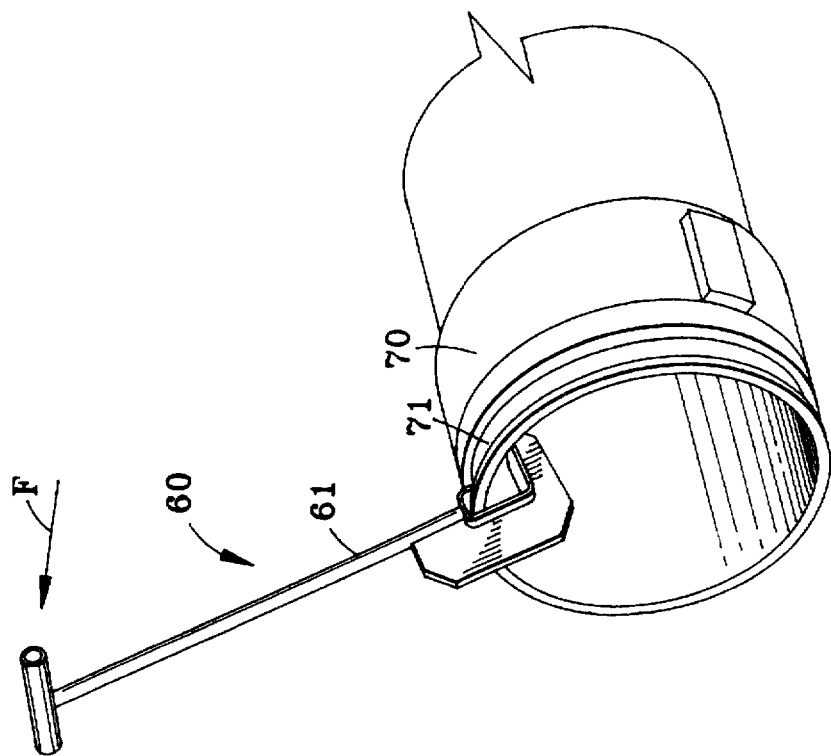
FIG. 9 is a perspective view showing the pipe pulling and lifting tool of FIG. 8 in engagement with a pipe to be pulled or lifted.
Figure 8:
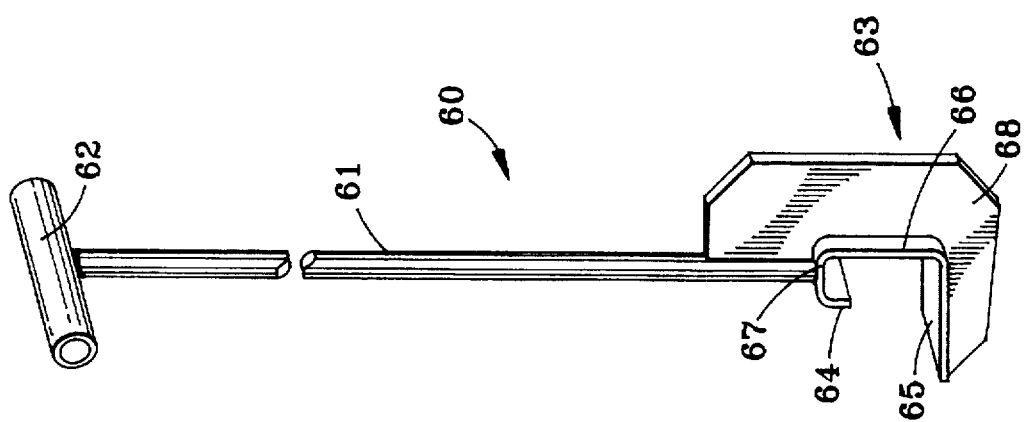
FIG. 8 is a perspective view of a pipe pulling and lifting tool according to a sixth embodiment of the present invention.

Referring to FIGS. 8 and 9, a pipe handling tool 60 according to a sixth embodiment is shown. The tool 60 includes an elongated handle 61 with a short handgrip 62 connected at one end thereof. A pipe engaging portion 63 is connected to the handle 61 at an end opposite the handgrip 62. The pipe engaging portion 63 includes an engagement tooth 64 and a stabilizing member 65. The tooth 64 extends generally parallel to the handle 61, while the stabilizing member 65 extends generally perpendicular thereto. In a preferred embodiment, the tooth 64 and stabilizing member 65 form an integral band with a backside 66 and a topside 67 integrally formed therebetween. A flange 68 in the form of a flat plate extends around an outer periphery of the engaging portion 63 to prevent stress deformation of the stabilizing member 65 with respect to the engagement tooth 64 during operation.

In operation, as shown in FIG. 9, the pipe handling tool 60 is positioned over a bell end 70 of a conventional irrigation pipe so that the engagement tooth 64 is received in a groove 71 adjacent the bell opening. The stabilizing member 65 extends inside the bell end 70 and engages an inner wall thereof. The stabilizing member 65 is of a sufficient length (e.g., 5 inches) to reduce local bending stress on the bell end 70 during use. With the tool 60 in engagement with the bell end 70, a pulling force can be exerted on the handle 61 in the direction F (FIG. 9) for disengaging the pipe from a bell end of an adjacent pipe (not shown).

The tool 60 greatly reduces the physical strain required to pull apart a pipe line at the end of an irrigation season. The tool 60 reduces the amount of stooping required by the operator, and enhances pulling power by providing a handgrip 62 for the operator. The tool 60 has no moving parts, making it very durable and easy to operate.

Figure 10:
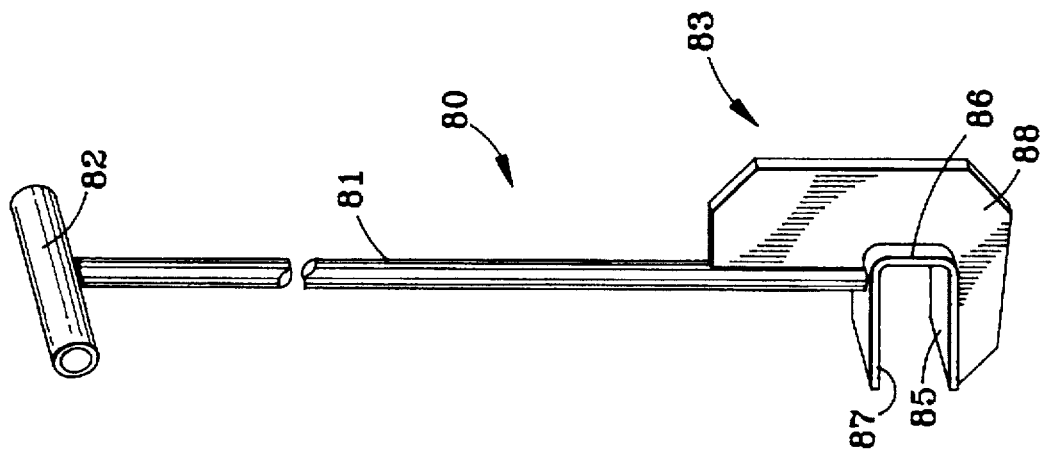
FIG. 10 is a perspective view of a pipe pulling and lifting tool according to a seventh embodiment of the present invention.

Referring to FIG. 10, a pipe handling tool 80 according to a seventh embodiment will be described. The tool 80 includes an elongated handle 81 with a short handgrip 82 connected at one end thereof. A pipe engaging portion 83 is connected to the handle 81 at an end opposite the handgrip 82. The engaging portion 83 includes a U-shaped engagement member having a lower face 85, a rear face 86, and an upper face 87. The upper face 85 and the lower face 87 extend generally perpendicular to the handle 81. A flange 88 in the form of a flat plate extends around an outer periphery of the engaging portion 83 to prevent stress deformation of the U-shaped engagement member during operation.

In operation, the pipe handling tool 80 is positioned over a bell end of a conventional irrigation pipe so that the wall of the pipe is received in the U-shaped engagement member. The lower face 85 of the pipe handling tool 80 tilts into engagement with an enlarged area of the inner wall of a conventional irrigation pipe bell end behind the rubber gasket. With the tool 80 in engagement with the bell end of an irrigation pipe, a pulling force can be exerted on the handle 81 for disengaging the pipe from a bell end of an adjacent pipe. The tool 80 can also be used to pick up and carry pipe without bending over.

As with the tool 60 (FIG. 8), the tool 80 (FIG. 10) can be used to reduce the physical strain required to pull apart a pipe line at the end of an irrigation season. Unlike the tool 60, however, the tool 80 is suitable for use on pipe that does not have a groove about an outer circumference of the bell end of the pipe.

Figure 11:
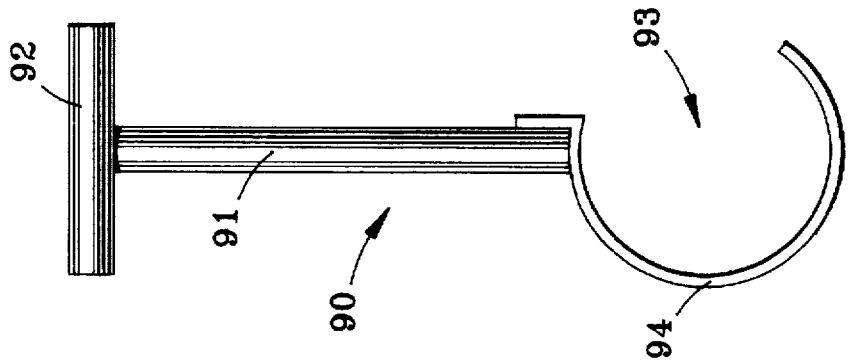
FIG. 11 is a side view of a pipe lifting tool according to an eighth embodiment of the present invention.

Referring to FIG. 11, a pipe lifting tool 90 according to an eighth embodiment will be described. The pipe lifting tool 90 includes an elongated handle 91 with a short handgrip 92 connected at one end thereof. A pipe engaging portion 93 is connected to the handle 91 at an end opposite the handgrip 92. The engaging portion 93 includes an arcuate member 94 having a diameter that is larger than a diameter of a pipe to be lifted. The arcuate member 94 extends circumferentially about a pipe to be lifted approximately 200 to 250 degrees about the center axis of the pipe. The arcuate member 94 is preferably formed of a spring steel material, such as a portion of a springtooth or field cultivator shank.

In operation, the tool 90 is positioned about a pipe to be lifted by sliding the arcuate member 94 under the pipe. The pipe can then be lifted using the hand grip 92 without stooping to reach the pipe. The tool 90 is particularly useful for lifting ends of pipe to align the ends as the pipe is being connected together. For example, the tool 90 can be used to raise the male end of a pipe into alignment with a female bell end of another pipe so that the pipes can be pushed together.

It will be appreciated that the various embodiments of the present invention are not limited to the exact construction that has been described above and illustrated in the accompanying drawings, and that various modifications and changes can be made without departing from the scope and spirit of the invention. It is intended that the scope of the invention only be limited by the appended claims.

What is claimed is:

1. A pipe turning tool for turning an agricultural irrigation pipe having a recess or protrusion on an outer periphery of the pipe, comprising:
   an elongated handle;
   a pipe engaging member fixed to said handle, said pipe engaging member comprising arcuate member having a concave surface for receiving a pipe to be turned, a first end adjacent to said handle, and a second end circumferentially spaced a greater distance from said handle than said first end, said arcuate member extending circumferentially approximately 60 to 100 degree, about a center axis of a pipe to be turned; and
   first and second engagement teeth fixed to and extending from first and second ends of said pipe engaging member, respectively, for engaging a recess or protrusion on a side or a top of a pipe to be turned, said first and second engagement teeth each extending in a direction generally radially inward toward a pipe to be turned, said first and second engagement teeth and said pipe engaging member providing a pipe engaging arrangement that permits a pipe to be turned upon applying a single force to the handle in a direction of turning.

2. The pipe turning tool as set forth in claim 1, wherein a line passing through the first and second ends of the arcuate member forms an angle with a longitudinal axis of said handle of approximately 110 to 150 degrees.

3. The pipe turning tool as set forth in claim 1, wherein a line passing through the first and second ends of the arcuate member forms an angle with a longitudinal axis of said handle of approximately 30 to 70 degrees.

4. The pipe turning tool as set forth in claim 1, wherein said first engagement tooth extends from the arcuate member at an angle less than 90 degrees relative to a tangential line through an adjacent portion of the arcuate member, said first engagement tooth extending in a direction that is angled slightly toward said second engagement tooth.

5. The pipe turning tool as set forth in claim 4, wherein said second engagement tooth extends from the arcuate member at an angle less than 90 degrees relative to a tangential line through an adjacent portion of the arcuate member, said second engagement tooth extending in a direction that is angled slightly toward said first engagement tooth.

6. The pipe turning tool as set forth in claim 1, further comprising an angle brace extending between said handle and a portion of said pipe engaging member spaced from said handle.

7. The pipe turning tool as set forth in claim 1, wherein said pipe engaging member is formed of an arcuate portion of a spring steel member.

* * * * *